(12) United States Patent
Narvaez et al.

(10) Patent No.: US 8,543,437 B2
(45) Date of Patent: Sep. 24, 2013

(54) SYSTEM AND METHOD FOR AUTOMATED CONTACT QUALIFICATION

(75) Inventors: Victor-Hugo Narvaez, Round Rock, TX (US); Heather Burnett, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/462,261

(22) Filed: May 2, 2012

(65) Prior Publication Data

US 2012/0215588 A1 Aug. 23, 2012

Related U.S. Application Data

(63) Continuation of application No. 12/494,482, filed on Jun. 30, 2009, now Pat. No. 8,200,524.

(51) Int. Cl.
*G06Q 10/00* (2006.01)

(52) U.S. Cl.
USPC ............................................. 705/7.11

(58) Field of Classification Search
USPC ............................................. 705/7.11
See application file for complete search history.

(56) References Cited

U.S. PATENT DOCUMENTS

| | | | |
|---|---|---|---|
| 6,067,525 A | 5/2000 | Johnson et al. | |
| 7,003,517 B1 | 2/2006 | Seibel et al. | |
| 7,082,427 B1 | 7/2006 | Seibel et al. | |
| 7,228,284 B1 | 6/2007 | Valliancourt et al. | |
| 7,315,861 B2 | 1/2008 | Seibel et al. | |
| 7,330,850 B1 | 2/2008 | Seibel et al. | |
| 7,340,410 B1 * | 3/2008 | Vaillancourt et al. | 705/7.15 |
| 7,340,411 B2 | 3/2008 | Cook | |
| 7,599,842 B2 * | 10/2009 | Tivey et al. | 705/1.1 |
| 2008/0109445 A1 * | 5/2008 | Williams et al. | 707/10 |

OTHER PUBLICATIONS

ReachForce Awarded Sixth Lead Generation Technology Patent, press release, Dec. 12, 2007, Austin TX, USA http://www.reachforce.com/news/12.12.2007.jsp.
Leads360 Targets Small Companies, Oct. 14, 2008, http://www.socaltech.com/leads36_targets_small_companies/s-0017907 html.

(Continued)

*Primary Examiner* — Romain Jeanty
(74) *Attorney, Agent, or Firm* — Terrile, Cannatti, Chambers & Holland, LLP; Robert W. Holland

(57) ABSTRACT

Contact lead quality is determined and presented to guide selection of contact leads for a predetermined activity, such as sales of a product, service or solution. A lead generation engine interfaces with a lead qualification module, an enterprise historical database and a lead confirmation tool to selectively analyze the lead information and qualification information to develop an ordered contact list for multiple contact leads, the ordered list ranking contact lead quality in multiple quality categories. A contact lead qualification graphical user interface presents multiple lead quality category ratings and values for a contact lead with each lead quality category indicative of a contact lead characteristic. These leads are then deemed relevant to sales and can be input in an organization's customer relationship management tool.

11 Claims, 7 Drawing Sheets

(56) References Cited

OTHER PUBLICATIONS

Bulldog Solutions Launches the Bulldog Index: Dynamic Benchmarking of Online Lead-Generation Data, press release, May 23, 2007, Austin, TX, USA http://www.bulldogsolutions.com/press_release/BDX_Release_Final.pdf.

Flexible CRM integration options to meet any need, http://www.eloqua.com/solutions/Eloqua_CRM_Integration.html, printed Nov. 30, 2009.

Lead Nurturing, Need to Keep Your Leads Warm Until They're Ready to Buy? http://www.eloqua.com/solutions/Lead_Nurturing_and_Management.html, printed Nov. 30, 2009.

ReachForce, Eloqua Integrate for B2B Marketing Product, Aug. 26, 2008, http://www.tmcnet.com/news/2008/08/26/3618725.htm.

Database Company Launches, Austin Business Journal, Feb. 14, 2006.

* cited by examiner

SYSTEM AND METHOD FOR AUTOMATED CONTACT QUALIFICATION

CROSS-REFERENCE TO RELATED APPLICATIONS

This application is a continuation of application Ser. No. 12/494,482, filed Jun. 30, 2009 now U.S. Pat. No. 8,200,524, entitled "System And Method For Automated Contact Qualification" naming Victor-Hugo Narvaez and Heather Burnett as inventors, and which is hereby incorporated by reference in its entirety.

BACKGROUND OF THE INVENTION

1. Field of the Invention

The present invention relates in general to the field of sales and marketing through information handling system and other contact media, and more particularly to a system and method for automated contact qualification for pursuing sales revenue.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems help enterprises improve productivity by allowing enterprise employees to do more with fewer resources. For example, enterprises attempt to improve the productivity of salespersons by identifying contacts for sales calls that result in more sales per marketing campaign or initiative, where a contact or a lead can be defined as a qualified lead that is ready to be delivered to a sales force to pursue sales revenue. Two problems that often arise with attempts to identify and qualify contacts for salespersons to engage are that the enterprise's sales force is understaffed relative to the number of generated leads and relative to the amount of pre-sales activity that occurs to vet and qualify a contact, and that the sales force lacks confidence in the credibility of the contacts as qualified leads, especially compared with existing customers that a sales person already knows to contact. In some instances, a line of business (LOB) having a product or product group to market and sell will have goals that differ from the goals of the sales force. For example, a marketing team might desire to find and nurture new customers and potential customers from a demographic with which the sales force is unfamiliar. In order to drive the sales force to target a desired demographic or other customer constraint, an enterprise must build credibility in the contacts given to the sales force through successful contact identification and qualification.

Often, a sales force is pulled in multiple directions to sell a variety of products with little in the way of guidance for priorities between different products and for different target customers. In some product markets, technologically complex products require specialized sales force knowledge in order to sell products to technologically savvy customers or to technologically uneducated customers who need white-glove treatment with regard to product explanation in order to close the sale. The job of the sales force is made more difficult as products periodically evolve or extend into a new customer base. Contacting and nurturing new customers to purchase expensive and complex products takes time and patience, often with the added expense to the sales person of lost sales to known customers for known products. As a result, a high demand is put on an enterprise sales force that complicates understaffing problems and the inability to drive multiple but necessary programs that are aimed at increasing sales.

Conventional sales techniques often involve a face-to-face meeting or webcast event by a marketing team to present a product or service followed by sales calls to all opt-in attendee contacts. However, sales force engagement to contacts based on a one-time marketing presentation typically results in sub-optimal contacts, thus reinforcing sales force bias against working in cooperation with marketing teams. Over the short term, sales efforts focused on developing and retaining existing accounts typically provides better results for a sales force than does development of new customers, however, development of new customers often is in the best interest of the enterprise as a whole. Collective action between marketing and sales teams tends to leverage database-driven marketing initiatives and provides better support for pre-sales activities than a sales team is generally able to do in a time-effective manner when working without marketing. Nurturing and qualifying potential customers for an enterprise by using concrete customer insights helps make sales and marketing activities more efficient and gives rise to new revenue streams through better cadence and credibility in the lead generation and qualification process. However, selecting, organizing, analyzing and presenting customer information in a manner that is readily understood by both marketing teams and sales teams presents a challenge.

SUMMARY OF THE INVENTION

Therefore a need has arisen for a system and method that automates contact qualifications, including evaluations, in a coordinated response.

In accordance with the present invention, a system and method are provided that substantially reduce the disadvantages and problems associated with previous methods and systems for contact qualifications. Contact generation identifies information about a person's role as a decision maker with regard to purchases, which is confirmed by outreach to further determine the quality of a contact and whether it is ready to delivered to the sales force. Contacts are based on information quality that is based on multiple quality characteristics that support a contact's quality and likelihood of contact success.

More specifically, a lead generation engine generates contact information associated with people to contact for a predetermined purpose, such as for selling a selected product or service. A lead qualification module performs person-to-person outreach to selected contact information to investigate lead quality, such as with outbound telephone outreach by telemarketing agents. A lead confirmation tool analyzes the lead information and quality information to define quality values in multiple lead quality categories that indicate characteristics of a lead contact. A contact lead qualification graphical user interface presents the multiple lead quality categories along with associated lead information to provide critical contact information to a sales person. The contact information allows adequate preparation for an initial sales engagement with the contact, and provides confidence in credibility for a contact so as to promote greater opportunity to accomplish a sales objective, such as a sale of a product or service.

The present invention provides a number of important technical advantages. One example of an important technical advantage is that contact qualifications are managed with a coordinated response. Customer information is organized, analyzed and presented in a manner that is readily understandable by marketing teams and sales teams. A graphical user interface outputs a summary of a lead qualification to provide enhanced insight to that lead's product needs to prepare for a sales presentation to the lead that addresses the lead's specific needs and to provide lead credibility. The selection of leads to contact enhances the efficiency of a sales force to best direct sales toward achieving enterprise goals versus short term sales goals. The availability of a contact's self-declared problems and needs helps to ensure that a complete and educated conversation follows a contact and encompasses all products that might be of interest to the contact. Qualified lead contacts lead to better contact results that help engender confidence in the qualification process and system so that enterprise goals more closely align with sales team goals.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Contact lead qualification improves enterprise marketing and sales cooperation for effectively presenting products to customers. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
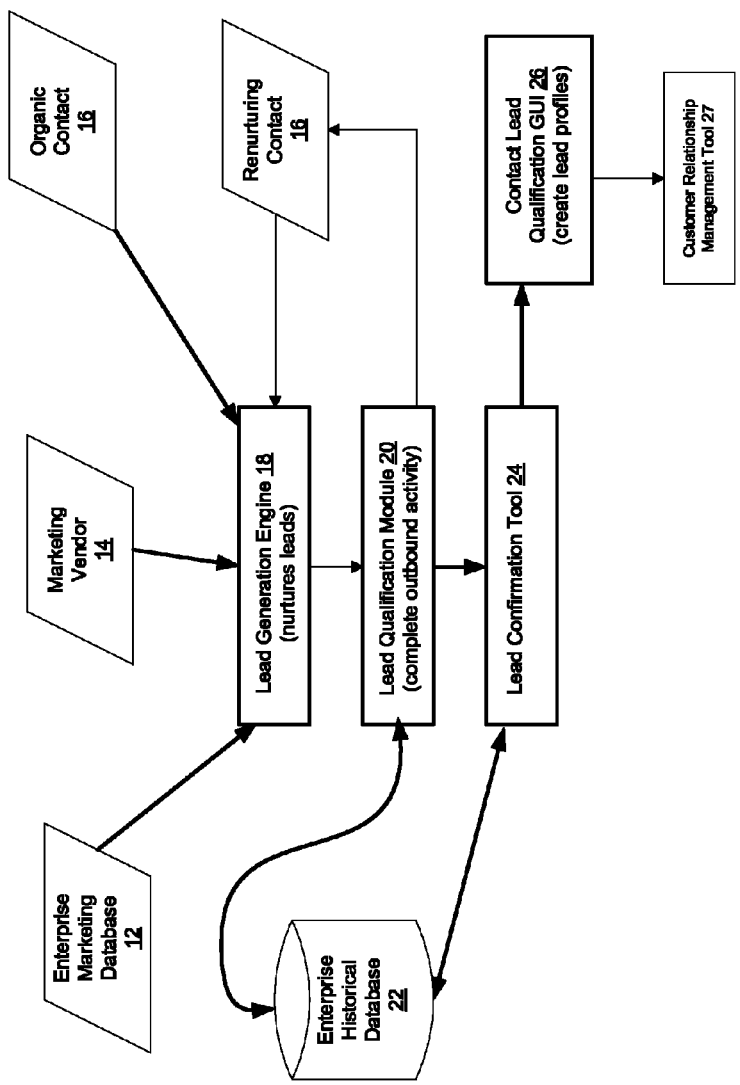
FIG. 1 depicts a block diagram of a system that automates contact lead qualification in a coordinated response.

Referring now to FIG. 1, a block diagram depicts a system for contact lead qualification. A lead enters the marketing program and proceeds through a lead nurturing model for collecting a contact list having multiple contacts associated with a product or service. A lead generation engine 18 obtains lead information from one or more sources regarding multiple contact leads. For example, lead generation engine 18 receives lead information from an enterprise marketing database 12, from marketing vendors 14 and/or from organic contacts 16, such as information indicating that a contact 16 has an interest in a product or service sold by the enterprise and has found the source of the lead generation engine web site on its own volition. In a lead generation program, the process continues for third party vendors to leverage the contact list and to drive other contact traffic to landing zone web sites for marketing the product or service in question. Lead generation engine 18 tracks and nurtures the lead information, such as by type of product or by contact identity, and provides the lead information to a lead qualification module 20. Online nurturing steps are taken for all contacts by, for example, providing educational or instructional information about the product, service or solution and assigning a value to the contact's behaviors and self-declared status as a viable decision maker, among other criteria. The lead qualification module 20 selectively investigates lead information to identify associated qualification information for the contact leads. The lead qualification module accomplishes outbound activity by calling contacts in an effort to engage them in a discussion about the product and service, while also determining/confirming their decision-maker role, their propensity to purchase and their desire to engage with a sales force. For example, the lead qualification module 20 promotes a product or service to a contact lead with outbound telephone calls to investigate the degree to which a contact has an interest in a product or service. The selected contacts for this activity are based upon progress made nurturing the contacts. The combined information is captured and is then mapped to business intelligence and output as a final comprehensive data report. The enterprise historical database 22 receives information from the lead qualification module 20 to provide a historical basis from past enterprise interactions and maps this data to a particular contact for use in further determining qualification information. A lead confirmation tool 24 interfaces with the combined output from the lead generation engine 18, the lead qualification module 20 and the enterprise historical database 22 to selectively analyze the lead information and qualification information to develop an ordered contact list for the contact leads, the ordered list ranking contact lead quality in multiple quality categories. This tool creates profiles for contacts that qualify the contacts for defined characteristics relative to each other and summarize data associated with each contact. The contact lead quality categories are presented in a contact lead qualification graphical user interface 26. The contact profiles are periodically reviewed to evaluate lead information quality and other contact feedback so that a determination is made of whether contacts are ready for approach by a sales team. Lead generation engine 18, lead qualification module 20 and lead processing tool 24 are, for example, instructions stored in a computer readable medium, such as memory in an information handling system, that execute on a processor to rank contact leads by quality categories, as set forth in greater detail with the following flow diagrams. It also may include various software components, such as a database or spreadsheet with algorithms. Finally, the lead can be input in a customer relationship management tool 27 for further follow up and final sale.

Figure 2:
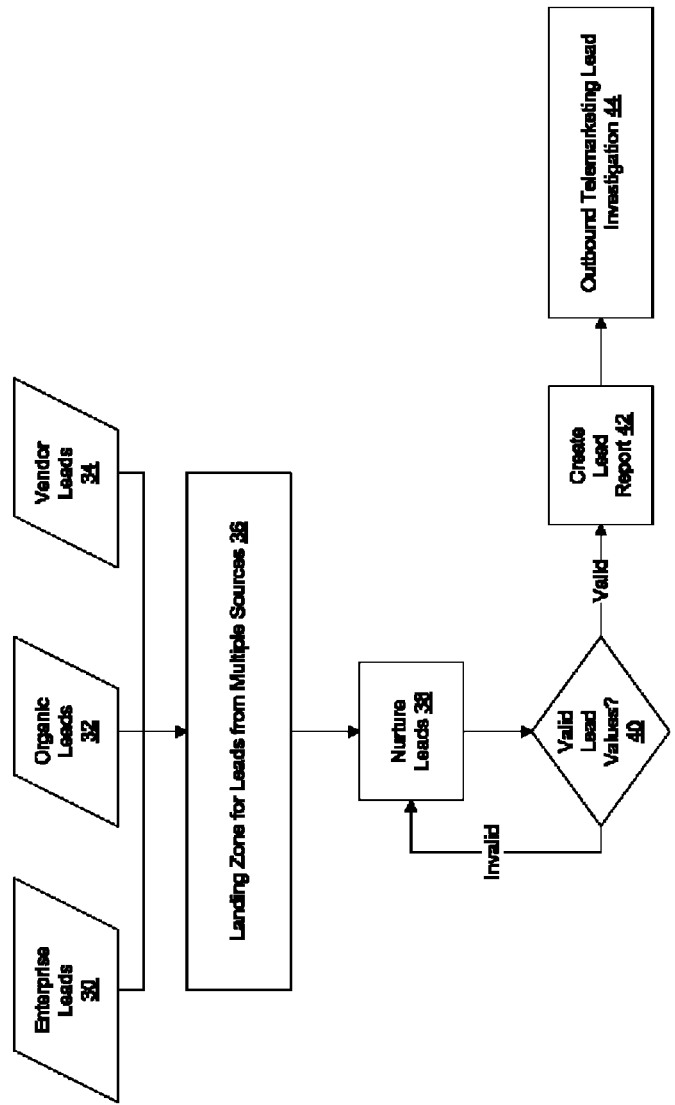
FIG. 2 depicts a flow diagram of a process for multiple contact lead information sources going through the lead generation engine.

Referring now to FIG. 2, a flow diagram depicts a process for multiple contact lead information sources going through the lead generation engine. The process starts with the generation of lead information from within an enterprise 30, from organic sources 32 and/or from third-party marketing vendors at step 34. At step 36, the lead information is accumulated at a landing zone, such as a web site, for evaluation of appropriate nurturing steps 38. Other leads from step 36 proceed to step 40 for an evaluation of its unique core and behavioral characteristics and to receive various stages of online nurturing. At step 40, values associated with each lead are validated, and leads having insufficient values are returned to step 38 for further nurturing. Leads with values above desired threshold values proceed to step 42 for preparation of a lead generation report that summarizes known lead element values.

Figure 3:
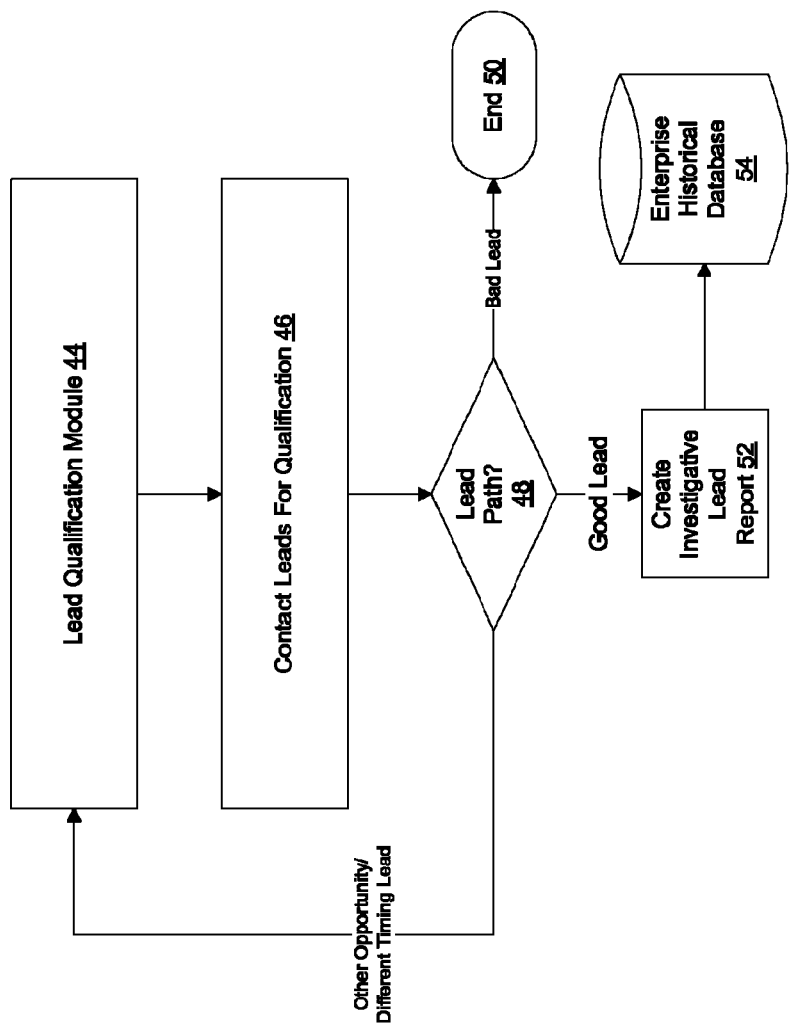
FIG. 3 depict a flow diagram of a process for a contact lead to be further qualified in a lead qualification module to generate a report, such as with information from an historical enterprise database.

Referring now to FIG. 3, a flow diagram depicts a process for contact lead report to be introduced to a lead qualification module. From step 44, selected leads are forwarded to step 46 for outbound lead investigation, such as with telemarketing contacts. At step 46, telephone calls or other types of outbound inquiries are initiated to investigate lead quality and generate additional customer recon/insight. At step 48, leads that lack a desired level of quality are returned to step 44 for evaluation at the lead generation landing zone. Leads that indicate a lack of interest in the product or service based upon the results of the lead investigation end nurturing at step 50. Leads that have greater than a threshold level of interest continue for sales evaluation starting at step 52. At step 52, good leads are output into an investigative lead report that will be accessible by accounting analytics and operational business intelligence for further evaluation.

Figure 4:
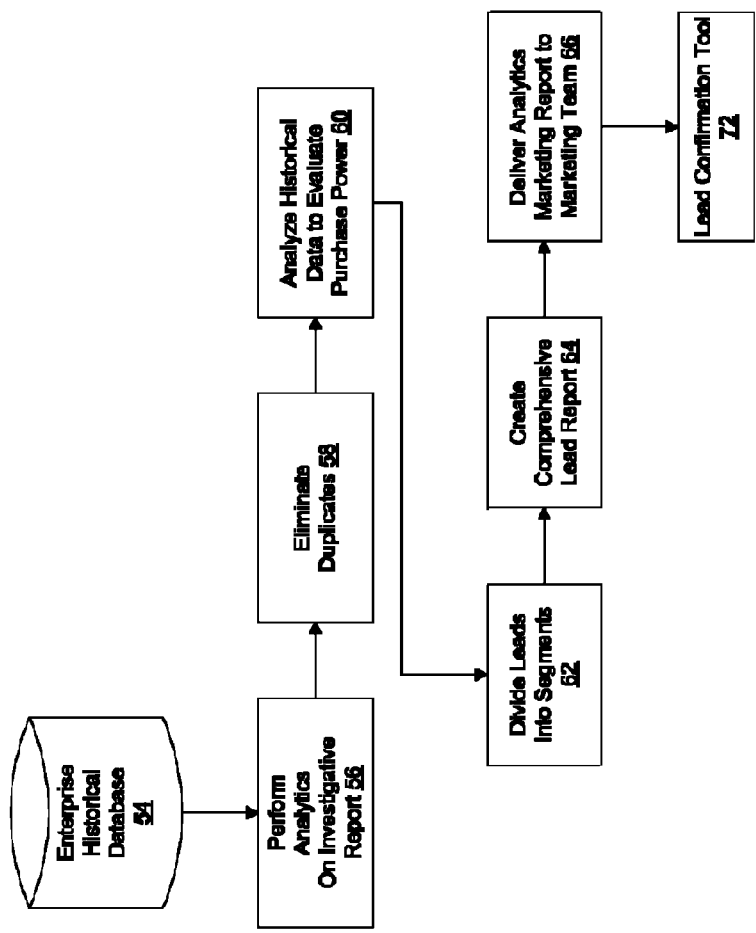
FIG. 4 depicts a flow diagram of a process for contact lead qualification to undergo validation of characteristics by comparing the data with an enterprise historical database.

Referring now to FIG. 4, a flow diagram depicts a process for contact lead qualification to undergo validation of characteristics by comparing the data with an enterprise historical database. At step 56, each lead is analyzed based on lead generation information and lead qualification information derived from outbound investigation to more precisely define lead characteristics quality. At step 58, the leads are analyzed to eliminate any duplicates. At step 60, the leads are mapped to existing and historical accounts to help evaluate the purchasing power of the lead, and the accounting analytics and operational business intelligence for each lead are augmented per lead line item in the report. At step 62, the leads are filtered into target segmentations, such as by the size of an enterprise associated with a lead, the industry or the product or service of interest to the lead. At step 64, a comprehensive lead report is created that includes values of characteristics known about the lead, such as the quality of predetermined lead characteristics based on lead generation information, lead quality information and historical business intelligence information. At step 66, the lead report is provided to a marketing team for review within the Lead Confirmation Tool, which is step 72.

Figure 5:
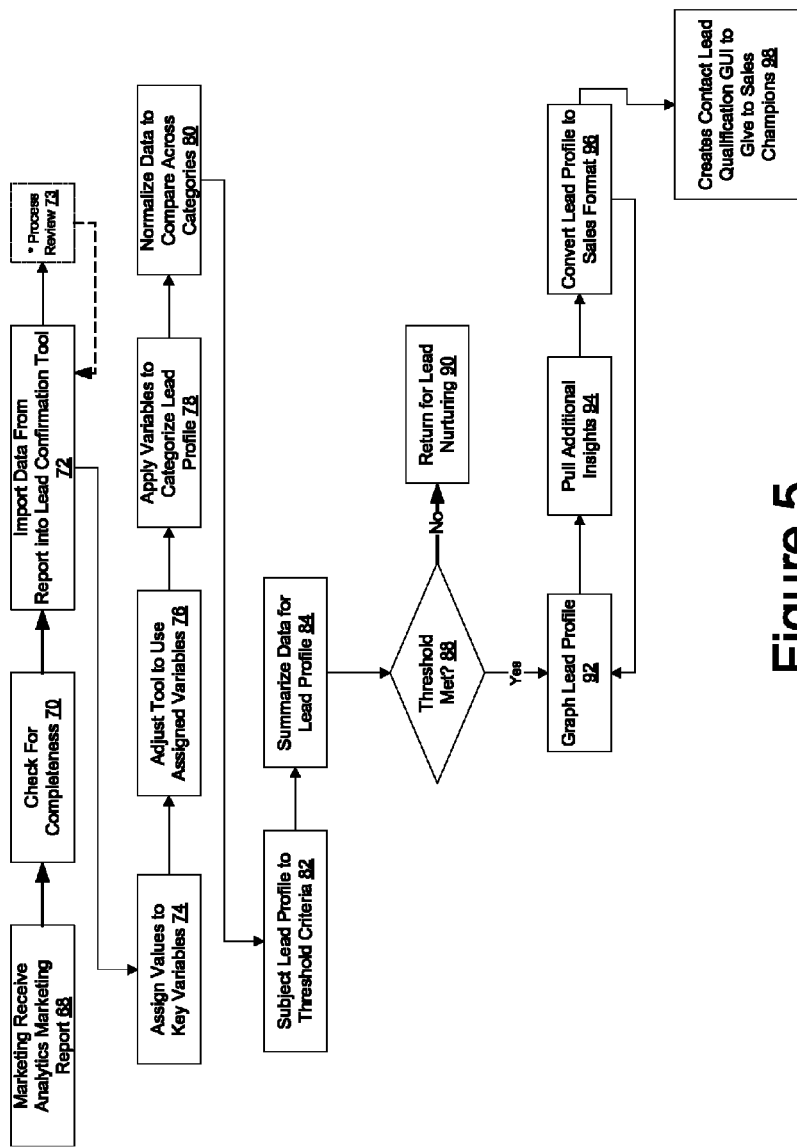
FIG. 5 depicts a flow diagram of a process for creating a contact lead profile presentation via a Lead Confirmation Tool.

Referring now to FIG. 5, a flow diagram depicts a process for creating a contact lead profile presentation via a Lead Confirmation Tool having intelligence for analyzing, cleansing and categorizing the data to ensure data validity. At step 68, the marketing team receives the analytics marketing report (the cumulative report including vendor, telemarketing, business intelligence) that summarizes desired quality characteristics of each contact. At step 70, a check is made for report completeness and data cleansing. This clean data is then imported into the Lead Confirmation Tool 72. Throughout this process, there are multiple Process Reviews 73 that determine process operation. At step 72, data from the report is imported to a processing tool, such as a database using SQL code, for modeling lead quality characteristics. At step 74, values are assigned to non-quantitative or other key criteria. At step 76, the modeling tools calculation parameters are adjusted to the newly assigned data values. At step 78, the modeling tool calculation parameters are applied to categorize one or more elements of the lead's profile. At step 80, the data is normalized for comparison purposes across quality characteristics. At step 82, each lead profile is subjected to a comparison against threshold values for the normalized data, such as by ensuring two of three normalized values exceed a desired quality characteristic value threshold. At step 84, the data for each lead profile is summarized with the normalized values and, at step 88, a determination is made of whether the lead profile quality characteristics exceed a threshold value in two of three quality characteristics. For example, a determination is made of whether the lead fits into the parameters that have been decided on as being a good quality lead for a particular marketing campaign. If not, the process continues to step 90 to return the lead for further nurturing and investigation and key learnings are derived. If yes, the process continues to step 92 for graphing of lead quality characteristics for each lead profile in a common format that allows a ready comparison between the various lead profiles. At step 94, additional information and insights available for the lead profile are associated with the lead profile so that a sales team member has sufficient information available to have an educated conversation with a contact of the lead profile. At step 96, the lead profile is converted to an end user format, such as a PDF format, for use by a sales team. The lead profile creation process ends at step 98, which is sales delivery, and the leads are forwarded to sales teams for action based on the relative lead quality characteristics for each lead. As an alternative option, the lead may cycle between steps 92 and 96 as needed to update the lead profile until it becomes a valid sales-ready lead and is accepted by the sales force, which at that point ends at step 98.

Figure 6:
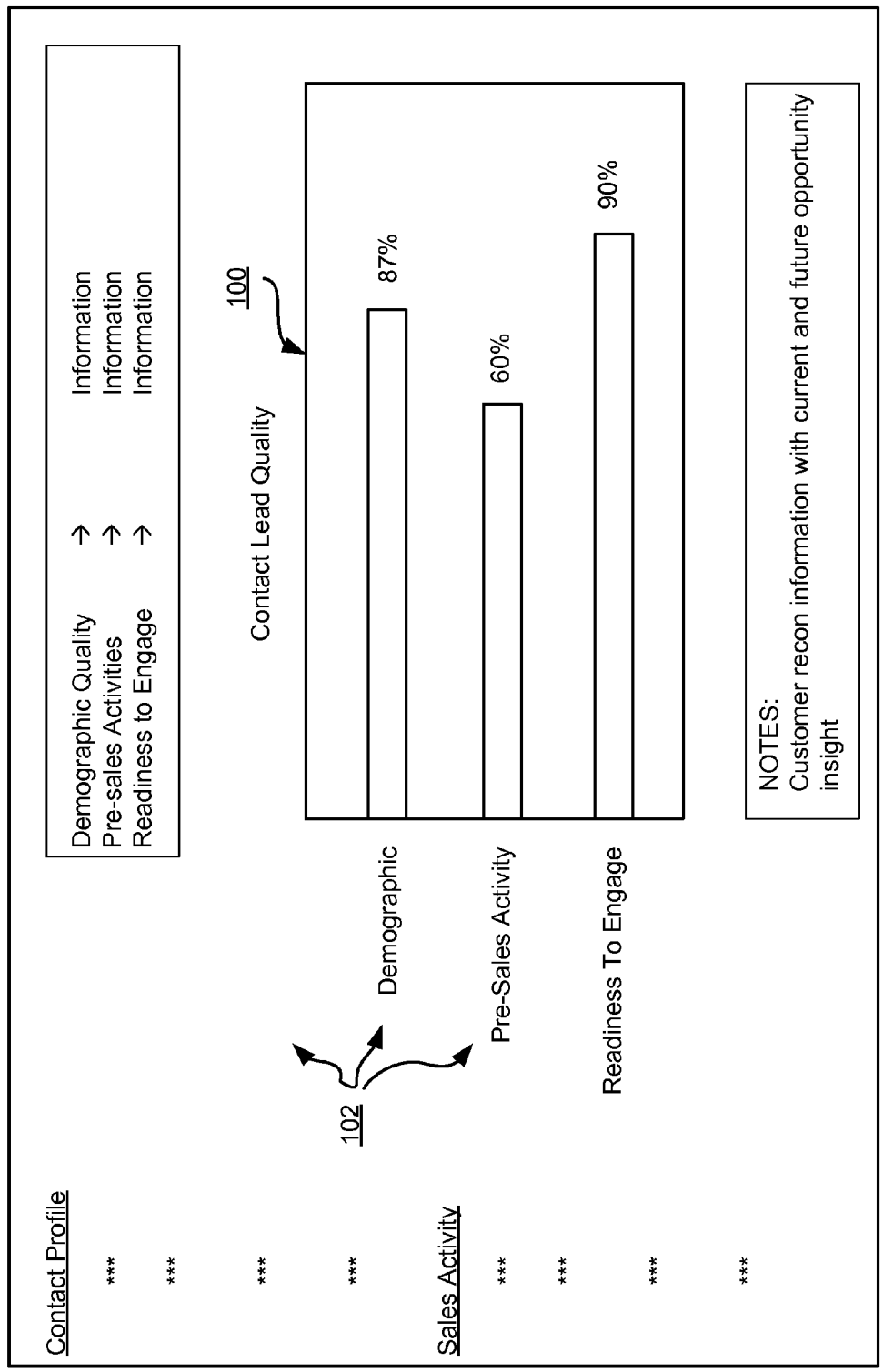
FIG. 6 depicts a contact lead qualification graphical user interface.

Referring now to FIG. 6, a contact lead qualification graphical user interface (or "lead profile report") is depicted. A lead quality characteristic view 100 provides a graphical representation of lead quality for a contact lead with multiple quality characteristics 102. In the example embodiment depicted by FIG. 6, lead quality characteristics presented include a readiness to engage characteristic, a pre-sales activity characteristic and a demographic quality characteristic. The overall graphical values indicate a lead's relative maturity level, which is indicative of the likelihood that the lead will purchase a product or service associated with the lead quality characteristics, while also providing the sales force with an additional resource for pre-sales activity. In the example depicted by FIG. 6, demographic quality reflects the decision role of the contact, the budget of the contact, the timeline within which to engage in a sales or product/service/solution implementation over which the contact has expressed interest in a product or service, inbound calls made by the contact to the enterprise and outsourcing desires of the contact. Pre-sales activity includes an information download by the contact, time spent studying products or service of interest, promotions provided to the contact, related assets owned by the contact, days in progress of the contact development, intimacy of the contact, client solution interest of the contact, and interest in available upgrades by the contact. A contact's readiness to engage quality characteristic reflects combinations of the demographic quality and pre-sales activity of the contact and other elements that are associated with a desirable behavior. The engagement information is collected and recorded to report data in a format that can be evaluated for feedback of the lead generation and confirmation process. In addition to the graphical representation of contact quality characteristics, a contact quality characteristics graphical user interface presents contact information, such as a name and phone number, quality information gathered by human or other interactions and a summary of sales activity, including customer recon information with current and future opportunities and insights. This solid system of lead qualification presents a consistent opportunity to deliver leads to sales.

Figure 7:
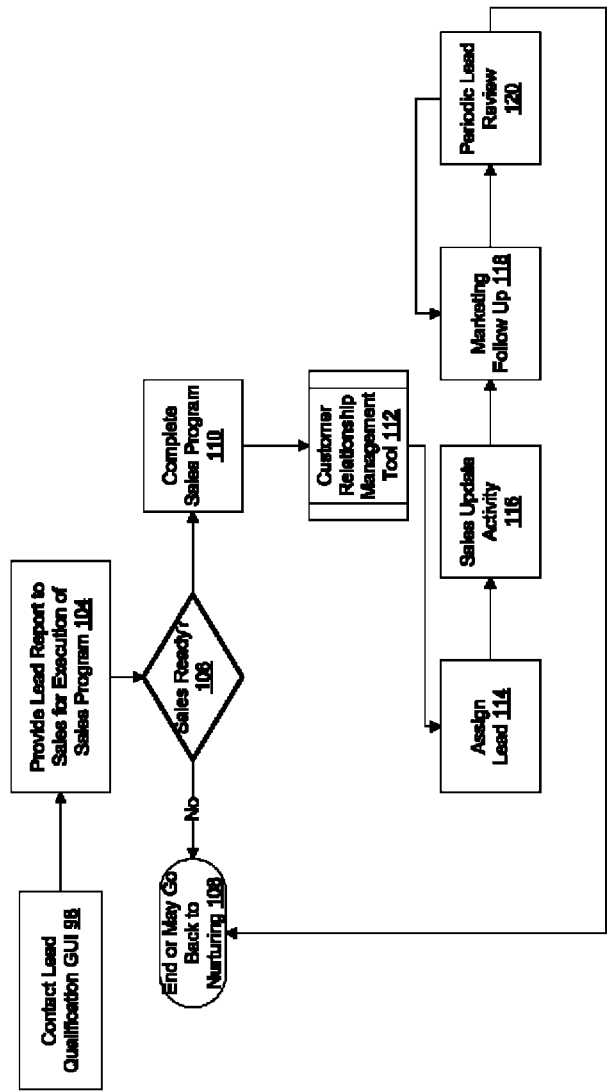
FIG. 7 depicts a supplemental process flow regarding the relevance of the lead to a sales force and further qualifies the lead's sales readiness quality.

Referring now to FIG. 7, this supplemental process flow depicts the relevance of the lead to a sales force and further qualifies the lead's sales readiness quality. The Contact Lead Qualification GUI 98 is created and provided to sales for execution 104. A lead is accepted at the sales program, assigned to a lead owner and assigned an identification number for tracking. If at step 106 the sales person determines that this lead is qualified and ready for sales engagement, then it moves on to complete the sales program 110 and is entered into the customer relationship management (CRM) tool 112. Contact qualification is applied by the sales owner as needed to optimize sales interaction with the lead contact. Key learnings are derived from this process. If the lead is determined to not be fully qualified to pass on to the sales force, then the process recycles and the lead continues in the nurturing queue. If the sales person determines (step 106) that the lead is not ready for sales, then the lead may be determined to be a bad lead and its path ends here (step 108) or it can go back into the nurturing process. The qualified leads are tagged with certain criteria that enables them to be easily integrated with online customer relationship management (CRM) tools that the sales forces utilizes. When a lead is input in the CRM tool 112, it is assigned to a sales person 114, the sales person updates activity information on the lead 116, and marketing is able to track and follow up on the lead within this CRM tool 118. Marketing performs periodic reviews of the leads at step 120. Periodic review between marketing and sales programs of lead contact engagement results allows improvements in the lead quality characteristics that further define contact actions. If the leads are still determined to be bad or in need of nurturing, then they are cycled back into the process of step 108. Lead generation and confirmation information is updated based upon the outcome of engagements with the lead contact. Marketing maintains a centralized scorecard with results from the lead contact engagements, CRM tool and sales progress, such as for use in evaluation and self-learning at the lead quality definitions. Based on the contact qualification and associated contact information, the lead contact is engaged as appropriate to optimize a desired outcome, such as a product or service sale.

In one example embodiment, lead information is generated by a contact's response to an e-mail promotion or advertisement. Lead information includes inputs made by the contact that indicate an interest in a particular product or service, such as a registration form filled out to obtain a white paper or view an educational webcast. Registration information might include the contact's position in an enterprise, such as a position in an enterprise's Information Technology department, and the types of educational information downloaded by the contact. For example, a contact's interest in products and/or services may be discerned from the subject matter or articles downloaded by the contact or webcasts watched by the contact. Nurturing methods may be applied to the contact over time in order to attempt to better characterize the quality of the contact as a lead to a sale of a product or service. For example, an e-mail confirmation of the registration might include additional educational information of interest to the contact. Once an adequate amount of lead generation information is gathered to suggest an outreach to the contact, confirmation of the contact as a lead for sale of a product or service though an outreach medium, such as a telephone call by marketing representatives. Qualification information generated by an investigation of the lead might include confirmation of the contact's identity and an educated discussion with the contact based upon the registration information and further investigation into the contact's needs. This educated discussion is based on a communication guide that directly ties into the backend lead confirmation tool and is strategically designed to help enable the sales force. Based upon the lead information and the qualification information, quality characteristics associated with the contact are computed for comparison with other leads in order to help guide the sales team in completion of a sale. Evaluation of a lead's behavior with lead generation information to assign a numerical value allows a comparison with other leads so that outbound marketing assets are used more efficiently in the investigation of the lead. Investigation of leads helps to determine the likelihood that a lead will result in a sale with a clear quality comparison of defined characteristics so that sales teams will have confidence in the leads provided to them. All of this pre-sales activity sets up this invention as a key part of doing more with less to enable the sales force and drive revenue.

Although the present invention has been described in detail, it should be understood that various changes, substitutions and alterations can be made hereto without departing from the spirit and scope of the invention as defined by the appended claims.

What is claimed is:

1. A contact lead qualification graphical user interface comprising:
   a depiction of at least a portion of an ordered list of contact leads presented at a display, the depiction having contact information associated with each of the contact leads, the ordered list ranking contact lead quality in multiple lead quality categories; and
   a depiction of multiple lead quality category ratings for the contact leads presented at the display, each lead quality category rating associated with an indication of a contact lead characteristic.

2. The contact lead qualification graphical user interface of claim 1 wherein the lead quality category ratings comprise a rating for activity of a contact lead relating to a product.

3. The contact lead qualification graphical user interface of claim 1 wherein the lead quality categories comprise activities suggestive of interest in purchase of a product and readiness to engage with a sales force.

4. The contact lead qualification graphical user interface of claim 1 wherein the lead quality categories comprise demographic quality information and pre-sales activity.

5. The contact lead qualification graphical user interface of claim 1 wherein the contact leads comprise individuals targeted for purchasing an information handling system.

6. A contact lead qualification graphical user interface comprising:
- a depiction of aggregated lead information for multiple contact leads, the aggregated lead information having selectively investigated lead information that identifies associated qualification information for the contact leads;
- wherein the lead information and qualification information are analyzed to present a depiction of at least a portion of an ordered contact list for the multiple contact leads, the ordered list ranking contact lead quality in multiple lead quality categories.

7. The contact lead qualification graphical user interface of claim 6 wherein the contact leads are sorted by multiple lead quality categories.

8. The contact lead qualification graphical user interface of claim 6 wherein the lead quality categories comprise activities suggestive of interest in purchase of a product.

9. The contact lead qualification graphical user interface of claim 6 wherein the lead quality categories comprise demographic quality information.

10. The contact lead qualification graphical user interface of claim 6 wherein the lead information comprises outreach by a contact to a predetermined marketing activity.

11. The contact lead qualification graphical user interface of claim 6 wherein the contact leads comprise individuals target for purchasing information handling systems.

\* \* \* \* \*